US009696930B2

(12) United States Patent
Appel et al.

(10) Patent No.: US 9,696,930 B2
(45) Date of Patent: Jul. 4, 2017

(54) REDUCING NEW EXTENT FAILURES ON TARGET DEVICE DURING NON-DISRUPTIVE LOGICAL DATA SET MIGRATION

(71) Applicant: International Business Machines Corporation, Armonk, NY (US)

(72) Inventors: Joachim R. Appel, Berlin (DE); Daniel K. Billing, Tampa, FL (US); John H. Hogan, Los Angeles, CA (US); Stephen A. Maxwell, Burke, VA (US); Richard G. Pace, Simi Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 14/735,356

(22) Filed: Jun. 10, 2015

(65) Prior Publication Data
US 2016/0364165 A1    Dec. 15, 2016

(51) Int. Cl.
*G06F 12/00*    (2006.01)
*G06F 3/06*    (2006.01)

(52) U.S. Cl.
CPC .......... *G06F 3/0631* (2013.01); *G06F 3/0604* (2013.01); *G06F 3/0647* (2013.01); *G06F 3/0683* (2013.01)

(58) Field of Classification Search
CPC .... G06F 3/0631; G06F 3/0683; G06F 3/0647; G06F 3/0604
See application file for complete search history.

(56) References Cited

U.S. PATENT DOCUMENTS

| 8,108,640 | B1 | 1/2012 | Holl, II | |
| 2009/0119673 | A1* | 5/2009 | Bubba | G06F 9/50 718/104 |
| 2010/0199058 | A1 | 8/2010 | Szowa et al. | |
| 2011/0107053 | A1 | 5/2011 | Beckmann et al. | |
| 2011/0153978 | A1* | 6/2011 | Chalemin | G06F 12/0284 711/171 |
| 2012/0005435 | A1* | 1/2012 | Emaru | G06F 3/0608 711/154 |
| 2012/0047312 | A1* | 2/2012 | Nathuji | G06F 9/3832 711/6 |
| 2012/0173831 | A1* | 7/2012 | Rubio | G06F 3/0605 711/165 |
| 2015/0095909 | A1* | 4/2015 | Li | G06F 9/45558 718/1 |
| 2015/0261462 | A1* | 9/2015 | Miwa | G06F 3/0653 711/114 |
| 2016/0373377 | A1* | 12/2016 | Cao | G06F 9/45558 |

* cited by examiner

*Primary Examiner* — John A Lane
(74) *Attorney, Agent, or Firm* — Zilka-Kotab, P.C.

(57) ABSTRACT

A method, according to one embodiment, includes selecting a source data set for migration; determining a predicted future total space allocation based on characteristics of the source data set; determining whether a target volume is capable of accommodating the predicted future total space allocation; migrating the source data set to the target volume in response to determining that the target volume is capable of accommodating the predicted future total space allocation; and requesting an adjustment to an amount of reserved free space on the target volume based on the predicted future total space allocation.

25 Claims, 10 Drawing Sheets

600

| days since last event | probability of new event during a 3 day migration |
|---|---|
| 0 | 0.107 |
| 1 | 0.140 |
| 2 | 0.172 |
| 3 | 0.203 |
| 4 | 0.232 |
| 5 | 0.261 |
| 6 | 0.288 |
| 7 | 0.314 |
| 8 | 0.340 |
| 9 | 0.364 |
| 10 | 0.388 |
| 11 | 0.410 |
| 12 | 0.432 |
| 13 | 0.453 |
| 14 | 0.474 |
| 15 | 0.493 |
| 16 | 0.512 |
| 17 | 0.530 |
| 18 | 0.547 |
| 19 | 0.564 |
| 20 | 0.580 |
| 21 | 0.596 |
| 22 | 0.611 |
| 23 | 0.625 |
| 24 | 0.639 |
| 25 | 0.652 |
| 26 | 0.665 |
| 27 | 0.678 |
| 28 | 0.690 |
| 29 | 0.701 |
| 30 | 0.712 |
| 31 | 0.723 |
| 32 | 0.733 |

| | Date of event | Time of event | Time between events |
|---|---|---|---|
| 1 | 01.01.13 | 02:00:00 PM | - |
| 2 | 02.01.13 | 12:30:00 AM | 10:30:00.00 |
| 3 | 02.01.13 | 09:30:00 PM | 21:00:00.00 |
| 4 | 03.01.13 | 08:00:00 AM | 10:30:00.00 |
| 5 | 04.01.13 | 05:00:00 AM | 21:00:00.00 |
| 6 | 04.01.13 | 03:30:00 PM | 10:30:00.00 |
| 7 | 05.01.13 | 12:30:00 PM | 21:00:00.00 |
| 8 | 05.01.13 | 11:00:00 PM | 10:30:00.00 |
| . | . | . | . |

| | date | time | utilization% |
|---|---|---|---|
| 1 | 05.01.13 | 04:30:00 pm | 35 |
| 2 | 05.02.13 | 09:12:00 am | 40 |
| 3 | 05.03.13 | 10:22:00 pm | 56 |

FIG. 8A

REDUCING NEW EXTENT FAILURES ON TARGET DEVICE DURING NON-DISRUPTIVE LOGICAL DATA SET MIGRATION

BACKGROUND

The present invention relates to data migration, and more particularly, to implementing data migration of a source data set by reserving an appropriate amount of space on a target volume.

Data migration is a process which is used to transfer data between storage locations. Specifically, with non-disruptive logical data set migration, migration software chooses data sets for migration by explicit specification and/or based on matching some masked naming criteria. The data sets selected for migration are referred to as "source data sets" and the devices on which they reside are referred to as "source volumes". The migration software also chooses the new location for the source data sets by explicit specification and/or by some criteria derived from the source data sets. The new location chosen for the source data sets are referred to as "target volumes".

Before choosing a target volume for a source data set, the migration software verifies that the target volume contains enough free space to accommodate the source data set. Moreover, after the migration software allocates the target data set, a synchronized or consistent copy is made of the source data set to the target data set. From that point, the migration software keeps the source and target data sets consistent using a mirroring process during which any update to the source data set is made to the target data set.

However, as the source data set grows in size due to more data being added, the target volume requires a corresponding increase in size. In the event that the target volume does not have enough space available to satisfy the increase in size of the source data set, the migration must be failed.

BRIEF SUMMARY

A method, according to one embodiment, includes selecting a source data set for migration; determining a predicted future total space allocation based on characteristics of the source data set; determining whether a target volume is capable of accommodating the predicted future total space allocation; migrating the source data set to the target volume in response to determining that the target volume is capable of accommodating the predicted future total space allocation; and requesting an adjustment to an amount of reserved free space on the target volume based on the predicted future total space allocation.

A system according to one embodiment includes a controller and logic integrated with and/or executable by the controller. The logic is configured to perform a method such as the foregoing method.

A computer program product, according to another embodiment, includes a computer readable storage medium having program instructions embodied therewith, the program instructions readable and/or executable by a controller to cause the controller to: select, by the controller, a source data set for migration; determine, by the controller, a predicted future total space allocation based on characteristics of the source data set; determine, by the controller, whether a target volume is capable of accommodating the predicted future total space allocation; migrate, by the controller, the source data set to the target volume in response to determining that the target volume is capable of accommodating the predicted future total space allocation; and request, by the controller, an adjustment to an amount of reserved free space on the target volume based on the predicted future total space allocation.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 6A is a table which lists simplified probabilities in accordance with one embodiment.

FIG. 7 is a table which lists the date and time associated with extent events in accordance with one embodiment.

FIG. 8A is a table which lists information associated with a data set in accordance with one embodiment.

DETAILED DESCRIPTION

Figure 1:
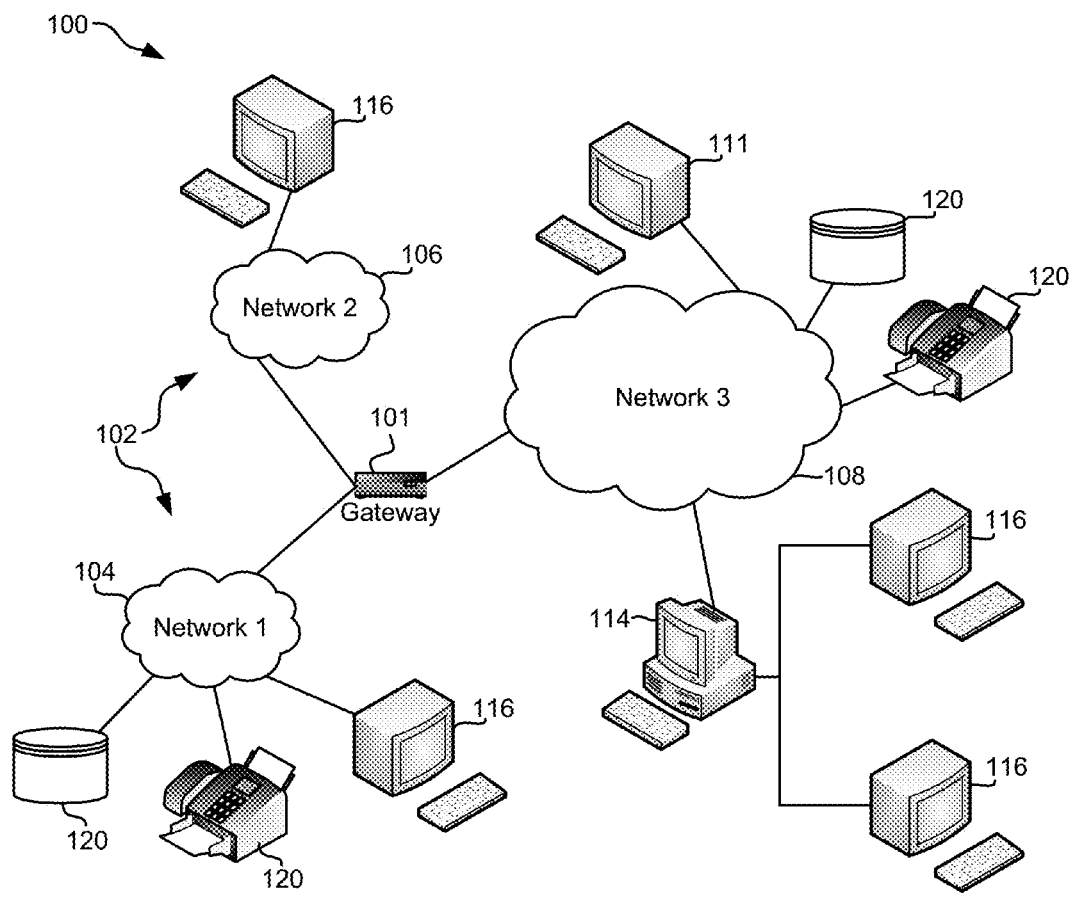
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing data migration of a source data set by reserving an appropriate amount of additional space on a target volume to accommodate any potential space requirements of the source data set during the migration process. By using analytical methods to achieve control over target volume space allocation, embodiments disclosed herein may be able to determine the prospect and/or possibility that a given data set will call for more space during the migration time frame, and in such case, the amount of space needed.

In one general embodiment, a method includes selecting a source data set for migration; determining a predicted future total space allocation based on characteristics of the source data set; determining whether a target volume is capable of accommodating the predicted future total space allocation; migrating the source data set to the target volume in response to determining that the target volume is capable of accommodating the predicted future total space allocation; and requesting an adjustment to an amount of reserved free space on the target volume based on the predicted future total space allocation.

In another general embodiment, a computer program product includes a computer readable storage medium having program instructions embodied therewith, the program instructions readable and/or executable by a controller to cause the controller to: select, by the controller, a source data set for migration; determine, by the controller, a predicted future total space allocation based on characteristics of the source data set; determine, by the controller, whether a target volume is capable of accommodating the predicted future total space allocation; migrate, by the controller, the source data set to the target volume in response to determining that the target volume is capable of accommodating the predicted future total space allocation; and request, by the controller, an adjustment to an amount of reserved free space on the target volume based on the predicted future total space allocation.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
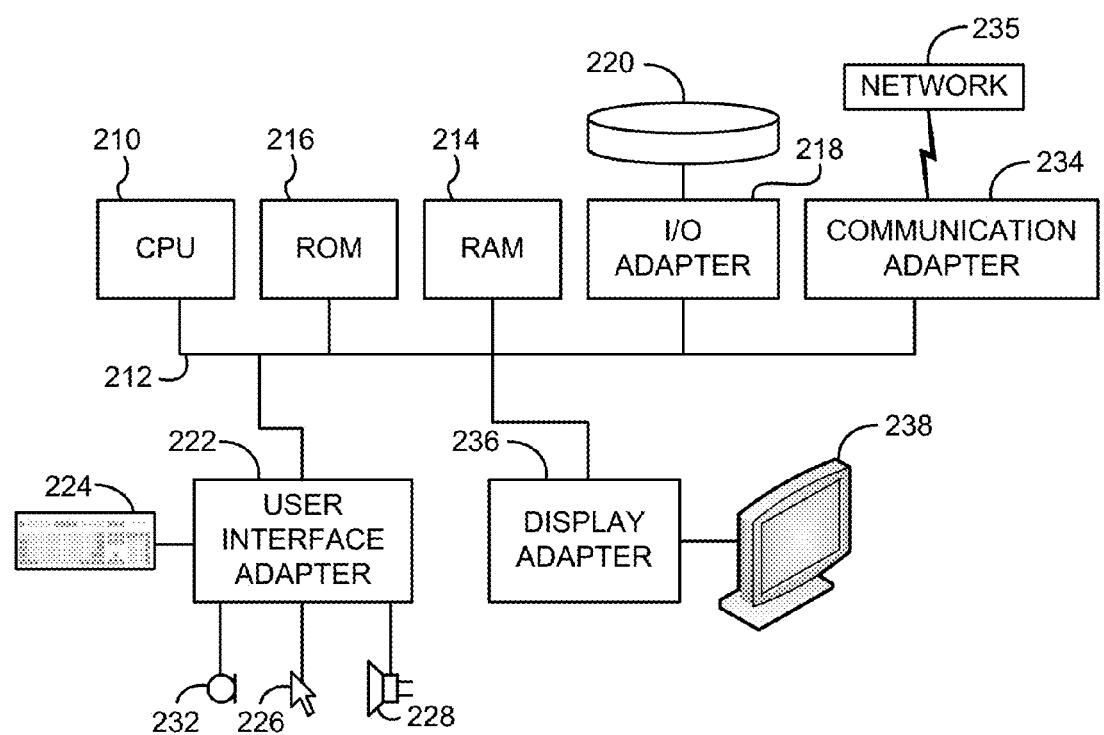
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
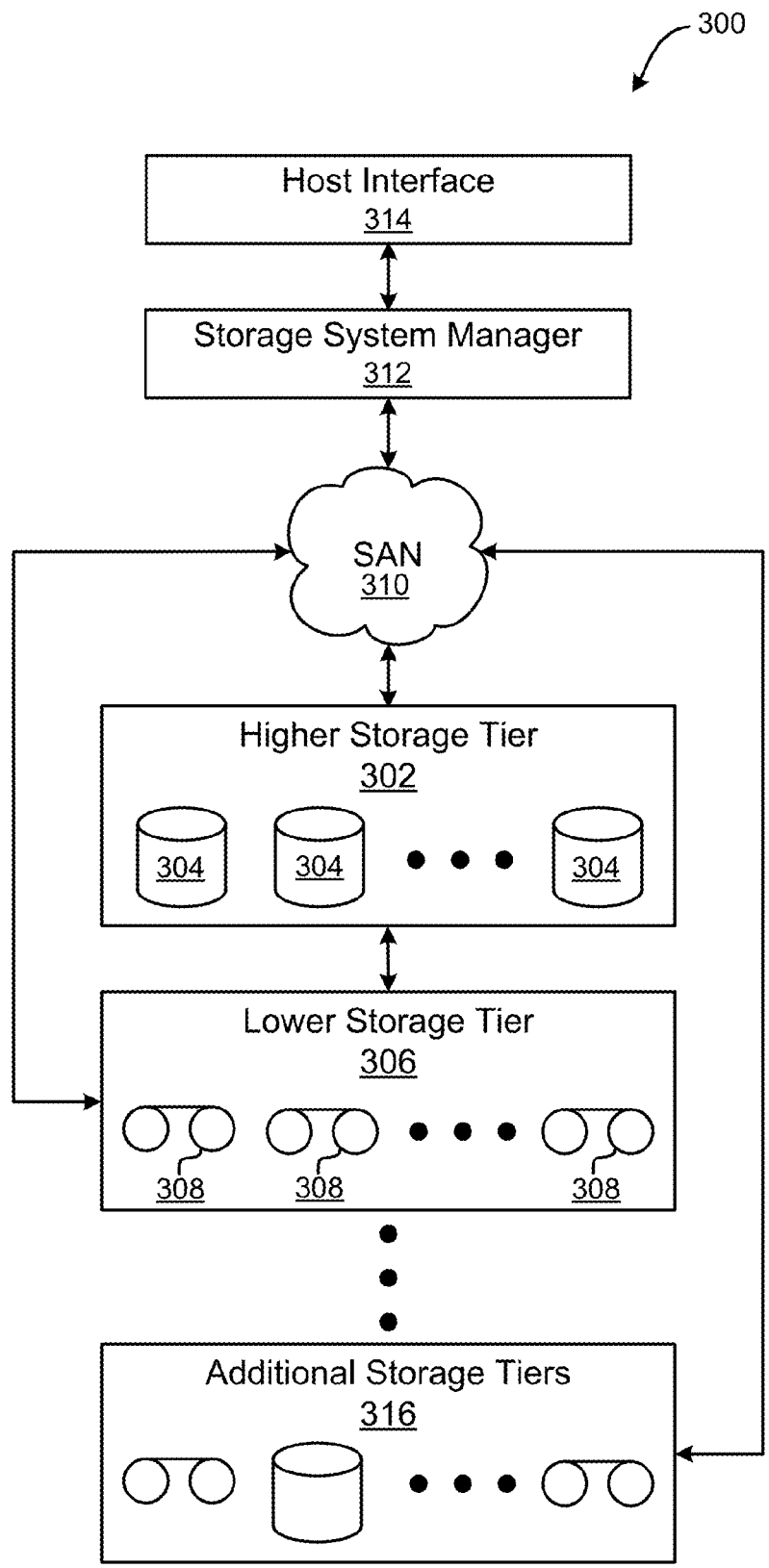
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

According to some embodiments, the storage system manager 312 may communicate with the storage media 304, 308 on the higher storage tier(s) 302 and lower storage tier(s) 306 through a network 310, such as a storage area network (SAN), as shown in FIG. 3, or some other suitable network type. However, according to other embodiments, the storage system manager 312 may serve as part of a z/OS operating system which may have storage devices directly attached to a system z-host.

The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Data migration is a process which is used to transfer data between source and target locations, e.g., devices, which may be local, remote or a combination of both. Before choosing a target volume for a source data set, migration software may verify that the target volume contains enough free space to accommodate the source data set. Moreover, after the migration software allocates the target data set, a synchronized or consistent copy is made of the source data set to the target data set. From that point, the migration software keeps the source and target data sets consistent using a mirroring process during which any update to the source data set is made to the target data set.

However, conventional attempts to verify that a target volume contains enough free space to accommodate a source data set are often inaccurate and lead to data migration errors, particularly for instances in which the source data set grows in size due to more data being added during the mirroring process. As the size of the source data set grows, the target volume must contain enough unused space to accommodate the added data in view of the mirroring process. In the event that the target volume does not have enough space available to satisfy the increase in size of the source data set, the data migration is failed.

Previous attempts to overcome conventional shortcomings in data migration have included several practices which have introduced a new set of data migration problems. One such previous attempt to overcome conventional data migration shortcomings includes automatically allocating additional space at the target areas corresponding to each source data set. However, not every data set makes use of the additional allocated space. Thus, allocating additional space at each target area for implementations in which tens of thousands of data migrations are taking place have left a large amount of unused allocated space on various target volumes that may otherwise be used for other data sets.

Previous contemplated attempts to overcome conventional shortcomings in data migration include allocating the target data set to a device such that some arbitrary threshold of free space remains after the target data set is allocated. However, the threshold selected is generally a percentage value and it is not clear what percentage value is effective across all target volumes. As a result, there is a high potential for choosing a threshold value that is too large for some target volumes or too small for other devices. Thus, many implementations have resulted in requiring more target volumes in order to complete the migration, or migration failures.

Still other previous attempts to overcome conventional shortcomings in data migration include allowing the target data set to extend to another device when more space is required for a target data set and there is no space or insufficient space available in the target volume. However, this action may not be appropriate, or even possible, for some data sets. For example, spanning a data migration between target volumes would not be possible for multi-volume striped data sets. Furthermore, spanning a data migration between target volumes also has a potential for causing even more mirroring problems than already experienced.

In sharp contrast to conventional shortcomings and the unsuccessful previous attempts described above, various embodiments described herein are able to implement data migration of a source data set by reserving an appropriate amount of additional space on a target volume to accommodate any potential space requirements of the source data set. This control over target volume space allocation may be achieved by employing any one or more of multiple analytic methods for predicting the behavior patterns of expansion of the data during migration as will be described in further detail below. By using analytical methods, embodiments disclosed herein may be able to determine the prospect and/or possibility that a given data set will call for more space during the migration time frame, and in such case, the amount of space needed.

Figure 4:
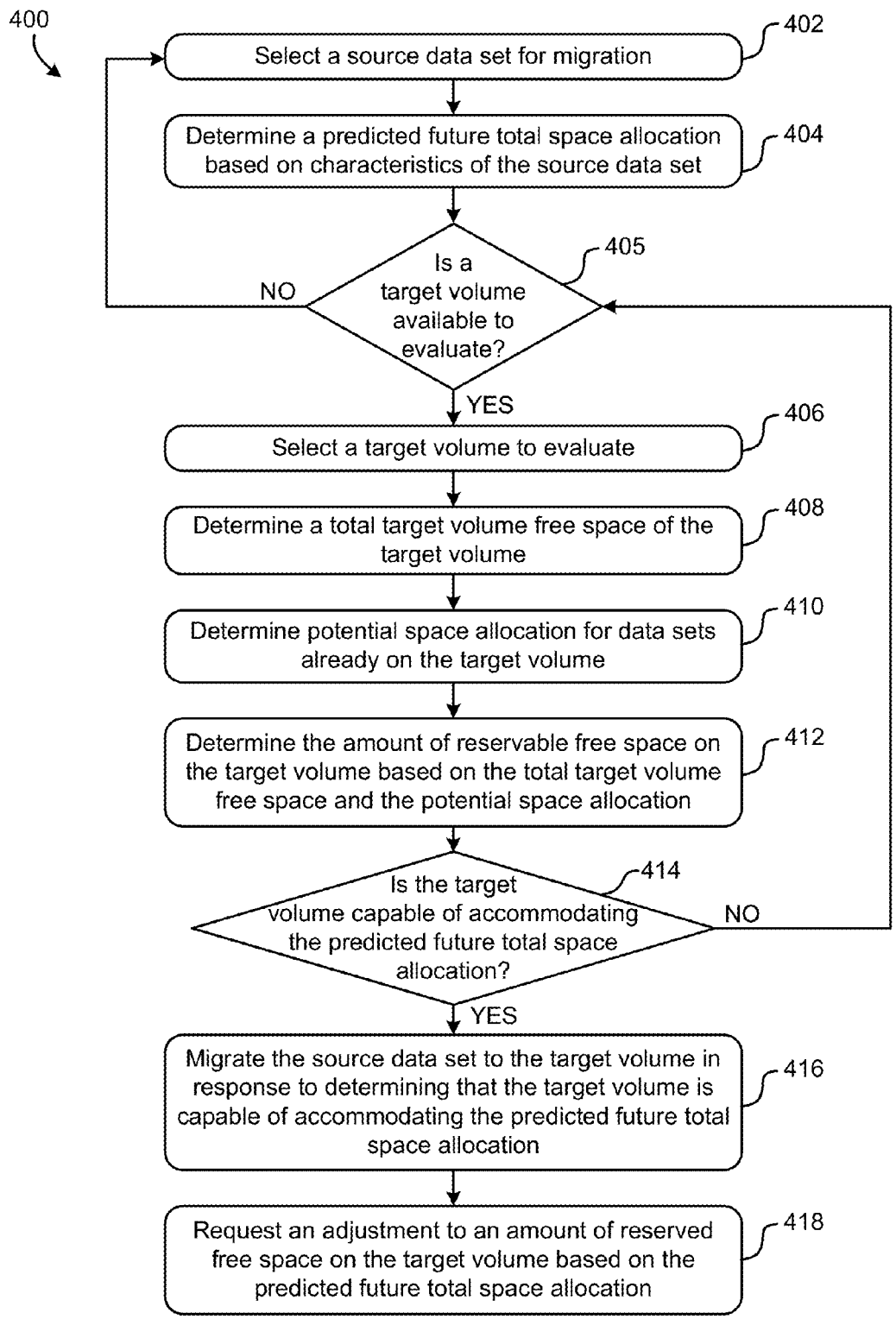
FIG. 4 is a flowchart of a method in accordance with one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, computer, switch, router, processing circuit, processor and logic integrated with and/or executable by the processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 includes operation 402, where a source data set is selected for migration. According to various approaches, data sets may be selected for migration by a user, a controller, a data processor, etc. based on an age of the data (amount of time since the data was written to its current location), a size of the data, data stability, etc. Moreover, a "data set" may include any desired amount of data.

Furthermore, method 400 includes determining a predicted future total space allocation based on characteristics and/or historical information of the source data set. See operation 404. Although a source data set occupies a specific amount of memory at a source volume at the time of migration, the size of the source data set may change during the migration. Specifically, the source data set may grow in size (also referred to herein as an "extent" or "extent event") which may result from additional data being added to the source data set during the migration thereof, e.g., particularly during the mirroring process of the migration. In the event that the size of the source data set does grow, the desired amount of free space at the target volume increases as well to accommodate the added size of the source data set in view of the mirroring process which occurs during the data migration. Thus, a predicted future total space allocation of a source data set may be used during the process of determining a target volume to which data migration may be directed, as will soon become apparent.

Free space at the target volume may be written to (e.g., allocated), reserved for a specific source data set, or remain free (e.g., available) to any incoming data, depending on the categorization of the space. While free space is available to accommodate any incoming data, only specific data corresponding to reserved free space may be written thereto. Thus, any difference between the actual size of a source data set and a predicted future total space allocation of the source data set may be accommodated by reserving free space at the target volume. Accordingly, the number of failed data migrations due to insufficient data storage space at a chosen target volume may desirably be reduced by reserving an appropriate amount of additional space on a target volume to accommodate any potential space requirements resulting from extent events. Moreover, free space at the target volume may be reserved by logically reserving the space, e.g., using control blocks, thereby enabling the re-categorization of the space should it be unused.

This improved control over target volume space allocation may be achieved by employing any one or more of multiple analytic methods for predicting the behavior patterns of data expansion during migration, as will be described in further detail below. Moreover, it should be noted that where a step is "based on" a given parameter, this is meant to infer that the step is based at least in part on the parameter. Thus, according to some approaches, a predicted future total space allocation may be determined based on the characteristics of the source data set in addition to other factors. However, according to other approaches, the predicted future total space allocation may be determined based solely on the characteristics of the source data set.

Referring still to method 400, decision 405 includes determining whether a target volume is available to evaluate. In response to determining that no target volumes are available to evaluate, method 400 returns to operation 402 where another source data set is selected for migration. However, in response to determining that one or more target volumes are available to evaluate, method 400 proceeds to operation 406. Operation 406 includes selecting a target volume to evaluate. Target volumes may be selected at random, in sequential order, based on a frequency of use, etc., depending on the desired embodiment. Furthermore, operation 408 includes determining a total target volume free space of the target volume.

Operation 410 includes determining potential space allocation for data sets already on the target volume. Depending on the embodiment, any one or more of multiple analytic methods for predicting the behavior patterns of data expansion during migration may be used to determining potential space allocation for data sets already on the target volume. Furthermore, operation 412 includes determining the amount of reservable free space on the target volume based on the total target volume free space and the potential space allocation.

However, it should be noted that in some embodiments space information associated with one or more potential target volume may be predetermined, e.g., before one or more operation of method 400 is performed, and stored in memory, e.g., a lookup table. Moreover, depending on the approach, the "space information" may include a total target volume free space, potential space allocations, reserved free space, etc., of the target volumes in view of data sets already stored thereon. According to an example, the potential space allocations for data sets already on the target volume may have previously been determined and stored in memory. Thus, operations 408 and/or 410 and/or 412 may include simply retrieving the total target volume free space and/or potential space allocation and/or reservable free space respectively, for the data sets already on the target volume from memory.

Referring still to FIG. 4, method 400 includes decision 414 which includes determining whether the target volume is capable of accommodating the predicted future total space allocation. According to some approaches, the determination made in decision 414 as to whether the target volume is capable of accommodating the predicted future total space allocation of the source data set, may be based on the amount of reservable free space on the target volume. Thus, the amount of reservable free space determined in operation 412 may have a direct effect on the flow of method 400.

When it is determined in decision 414 that the target volume is not capable of accommodating the predicted future total space allocation, method 400 returns to decision 405 where it is determined whether another target volume is available to evaluate. In the event that no more target volumes are available for evaluation, and none of the target volumes are capable of accommodating the predicted future total space allocation, the source data set may not be able to be migrated, e.g., at least at the present time. Accordingly, method 400 may return to operation 402 where a different source data set is selected for migration. It should be noted that although a source data sets may not be able to be migrated at a current point in time, the same source data set may be re-evaluated for migration at a future point in time whereby a different result may be reached and the source data set may be migrated to a target volume. However, some source data sets may simply be skipped over and not migrated, even at future points in time.

However, upon determining that the target volume is capable of accommodating the predicted future total space allocation, method 400 proceeds to operation 416 whereby the source data set is migrated to the target volume. Migrating the source data set to the target volume includes allocating a specific amount of data space (e.g., amount of memory) that a source data set is known to currently occupy in the source volume. For example, migrating a source data set which currently occupies 10 cylinders of data space in the source volume includes allocating an equal amount of data space in the target volume. However, it is preferred that allocation of data space at the target volume is only performed to accommodate a specific amount of memory that a source data set is known to currently occupy. Data space at the target volume may be reserved, but is not allocated, to accommodate any additional potential space allocation for the source data set during the migration, as will be described in further detail below (e.g., see FIG. 5).

With continued reference to FIG. 4, it should be noted that, although method 400 is depicted as migrating the source data set to the target volume directly as a result of determining that the target volume is capable of accommodating the predicted future total space allocation of the source data set, the migration may be delayed in alternate approaches. For example, method 400 may evaluate more than one target volume capable of accommodating the predicted future total space allocation. Method 400 may further keep track of (e.g., store in memory such as HDD) the total target volume free space and/or the amount of reservable free space on each of the more than one target volumes evaluated and ultimately chose to migrate the source data set to a target volume having the most free space and/or the most reservable free space.

Referring still to method 400, operation 418 includes requesting an adjustment to an amount of reserved free space on the target volume based on the predicted future total space allocation. As mentioned above, free space at the target volume may be assigned to (e.g., allocated), reserved for a specific source data set, or remain free (e.g., available) to any incoming data, depending on the categorization of the space. While free space is available to accommodate any incoming data, only specific data corresponding to the reserved space may be written thereto. Thus, as predicted future total space allocations of the various source data sets change over time, categorization of the space at the target volume is preferably adjusted accordingly. As described above, free space at the target volume may be reserved by logically reserving the space, e.g., using control blocks, thereby enabling the re-categorization of the space should it be unused.

According to an example, when the migration of data from a source data set to a target volume has been completed, it is desirable that any unused reserved free space at the target volume associated with the source data set is recategorized as free space. In other words, unused reserved free space at the target volume associated with a completed source data set migration is preferably transitioned to unreserved free space which may be used to accommodate the data migration of a subsequent source data set. Thus, space at target volumes is efficiently used and discrepancies between the predicted future total space allocations of the various source data sets and the actual amount of space used may be recovered and reapplied to future migration operations, which is in sharp contrast to conventional shortcomings which result in large amounts of unused allocated space as described above. Moreover, it should be noted that a data migration includes the associated mirroring process and the data migration may thereby be completed only after the new data set at the target location is relied upon (e.g., accessed) during operation.

Figure 5:
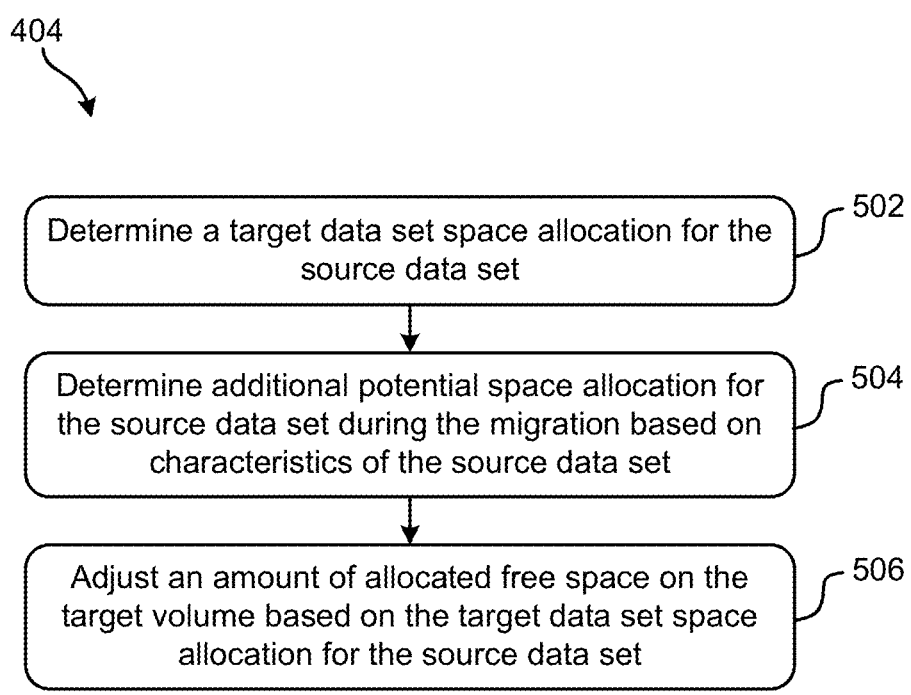
FIG. 5 is a flowchart of a sub-operation in accordance with one embodiment.

Referring now to FIG. 5, exemplary processes of operation 404 are shown according to one embodiment. The exemplary processes of operation 404 may be performed in accordance with the present invention in any of the environments depicted in FIGS. 1-4, among others, in various embodiments. Of course, more or less processes than those specifically described in FIG. 5 may be included in the performance of operation 404 above, as would be understood by one of skill in the art upon reading the present descriptions.

Each of the exemplary processes of operation 404 may be performed by any suitable component of the operating environment. For example, in various embodiments, the exemplary processes of operation 404 may be partially or entirely performed by a controller, computer, switch, router, processing circuit, processor and logic integrated with and/or executable by the processor, etc., or some other device having one or more processors therein. The processor, e.g., processing circuit(s), chip(s), and/or module(s) implemented in hardware and/or software, and preferably having at least one hardware component may be utilized in any device to perform one or more of the exemplary processes of operation 404. Illustrative processors include, but are not limited to, a central processing unit (CPU), an application specific integrated circuit (ASIC), a field programmable gate array (FPGA), etc., combinations thereof, or any other suitable computing device known in the art.

Looking now to FIG. 5, operation 404 includes determining a target data set space allocation for the source data set, and determining additional potential space allocation for the source data set during the migration based on characteristics of the source data set. See processes 502 and 504 respectfully.

By determining a target data set space allocation for the source data set, a specific amount of memory that a source data set is known to currently occupy (or will occupy) at a source volume may be ascertained at about the time of migration. For example, the source data set may currently occupy 10 cylinders of data space in the source volume, which may thereby define how much space will be used at a target volume to enable migration of the source data set as it currently exists in the source volume. Accordingly, an appropriate amount of memory in the target volume may be allocated to accommodating the source data set migration. Status of memory at the target volume may be managed by a controller, a processor, a user, etc., and/or stored in memory, e.g., a lookup table. Accordingly, an amount of allocated free space on the target volume may be adjusted based on the target data set space allocation for the source data set. See process 506. Moreover, by determining an additional potential space allocation for the source data set during the migration as seen in process 504, a prediction may be made as to the likelihood and/or amount of source data set size dilation during migration thereof and memory on the target volume may be reserved accordingly.

Again, making an accurate determination of a predicted future total space allocation of a source data set is desirable as it achieves improved control over target volume space allocation. Various embodiments described herein determine a predicted future total space allocation of a source data set based on characteristics of the source data set. Such characteristics may include any information relating to the source data set, such as file size, historical number of accesses, Volume Table of Contents (VTOC) information, other historical information, etc. However, it should be noted that determining the predicted future total space allocation based on characteristics of the source data set may preferably be made without reference to other source data sets. In other words, the various embodiments described herein may be able to make predictions concerning potential future space requirements for a given file based solely on the file itself, and without reference to any other files.

Examples of such characteristics are provided below with reference to various exemplary procedures, any one or more of which may be employed for determining the additional potential space allocation for a given source data set. It follows that the various exemplary procedures presented below may predict the behavior patterns of data expansion during migration of a source data set, and ultimately making an accurate determination of a predicted future total space allocation of the source data set.

Analysis of Data Set Properties

According to one embodiment, the predicted future total space allocation based on characteristics of the source data set may include an analysis of properties of the source data set. In various approaches, properties of the source data set may include any one or more of VTOC analysis, VSAM (Virtual Storage Access Method) Volume Data Set (VVDS), existing number of extents, consolidation of the data set, allocated space v. primary allocation value comparison, a volume number of the data set, etc., or any other properties of the source data set which would be apparent to one skilled in the art upon reading the present description. Moreover, inferences may be made from the properties of a data set. According to an example, which is in no way intended to limit the invention, an inference may be made that, a data set which was created 10 days ago and which is currently at a $10^{th}$ extent on a volume, has expanded 10 times, e.g., possibly one time each day over the last 10 days.

Simple Historical Probability

According to another embodiment, the predicted future total space allocation based on characteristics of the source data set may include a historical probability. In other words, a weighted factor indicative of how likely the allocation of a new source data set expansion (e.g., an extent) will be during the migration time may be determined, based at least in part on past observations. This weighted factor, in combination with other criteria (e.g., which may be derived from the current source environment), may be used to reduce the risk of a failure occurring on the target data set as a result of an extent event. According to various approaches, the historical probability may be based, at least in part on, data set information, e.g., such as when the data set was created, when the data set was deleted, when new space was allocated, etc. Moreover, the data set information may be derived from System Management Facility (SMF) data records which may be recorded for an arbitrary length of time, e.g., SMF data could represent 2 months of data, three months of data, or however long the customer might be collecting that data.

Thus, the predicted future total space allocation may be determined using the probability of a new extent occurring. Moreover, the probability of a new extent occurring may be based on: the number of new extent events which occurred in the past and/or the amount of time since the last new extent event occurred. For instance, analyzing a data set may reveal that every week the data set might be adding a new extent; four weeks of data for which four new extents occurred over those four weeks. Moreover, if the migration of a source data set is starting at the end of the following week cycle, it may be inferred that the source data set is going to expand to a new extent within the migration window, e.g., in view of the four week trend. Thus, this potential expansion would preferably be accommodated for, e.g., by determining the probability of how likely it is that the event will happen based on the historical data available.

According to an in-use example, which is in no way intended to limit the invention, a source data set in question may have 20 tracks. Moreover, by examining a recorded history (e.g., SMF data records) associated with the source data set in question, an extent frequency may be determined. According to the present in-use example, the recorded history may indicate that on average, every three weeks a new extent has been allocated for the data set in question. Specifically, 10 new extent events are found in SMF data covering a total of 270 days. Moreover, the last event (new extent allocation) for the data set in question occurred 6 days ago and an estimated amount of time required for a data migration to be completed is 3 days.

In order to simplify an extent prediction without attempting to determine an occurrence pattern (e.g., frequency distribution), the previous events can be treated as conditional and independent. In other words, the longer it has been since an extent occurred the more likely it is that a new extent will occur.

It follows that the probability of a new extent occurring during an estimated duration of a migration may be represented by the inverse probability of no occurrence for 9 consecutive days (i.e., the last extent allocation for the data set in question occurred 6 days ago, in addition to the estimated 3 days required for a data migration to be completed: 6 days+3 days). This inverse probability is calculated below in Equation 1.

$$1-(1-1/27)^{(3+6)}=1-(26/27)^9=0.2879 \qquad \text{Equation 1}$$

Figure 6B:
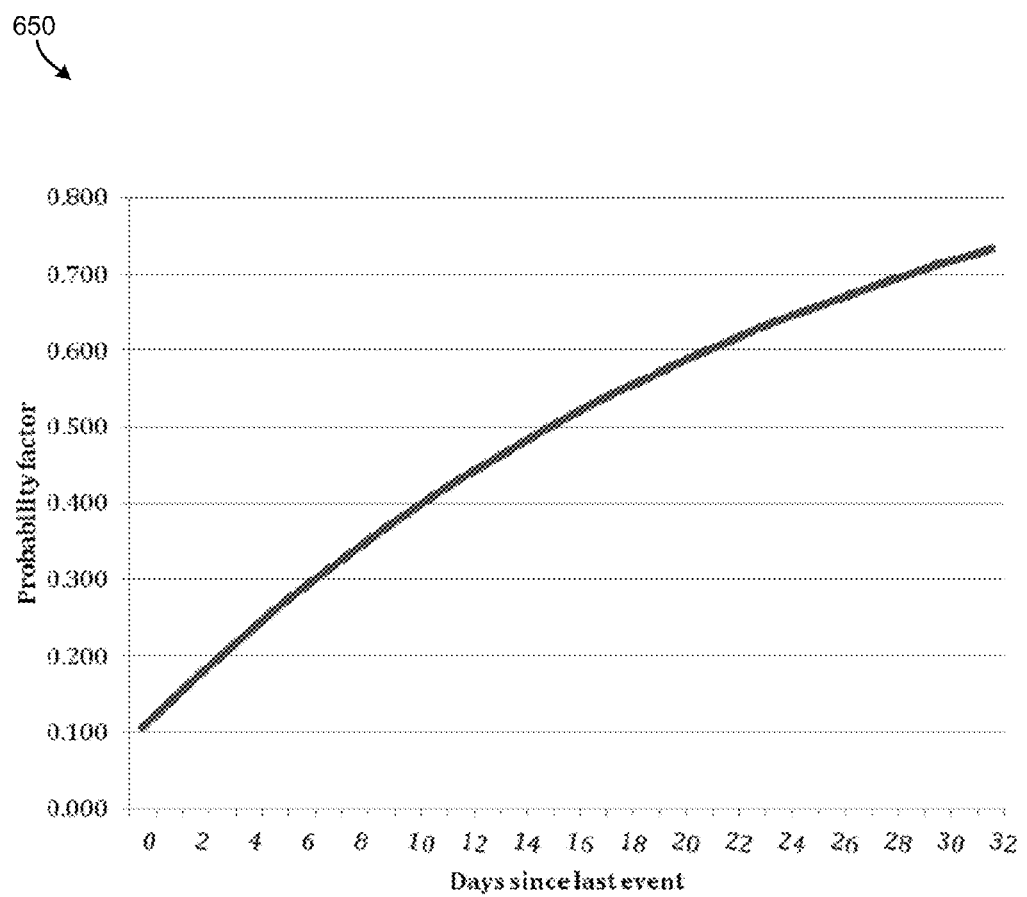
FIG. 6B is a graph which plots the data stored in the table of FIG. 6A.

Looking to FIG. 6A, the table 600 depicted therein lists the simplified probabilities for the above example of a migration taking 3 days as a function of the number of days since the last extent was created. Moreover, FIG. 6B includes a graph 650 which illustrates the relationship between the probability of a new extent occurring with respect to the number of days since the last extent occurred.

As shown, the probability of a new extent occurring increases as the number of days since the last extent occurred increases.

It follows that Equation 1, in view of FIGS. 6A-6B, may be simplified to achieve Equation 2 which represents a generally applicable formula:

$$w = 1 - \left(\frac{t_1 - n}{t_1}\right)^{(t_2 + t_3)} \quad \text{Equation 2}$$

With reference to Equation 2, the variables are intended to represent the following:
w: probability weight factor.
$t_1$: size of analysis window in time units.
$t_2$: migration duration in time units.
$t_3$: time since last event in time units.
n: number of new extent allocation events within an analysis window.

Furthermore, the time unit is preferably chosen such that Equation 3 is satisfied:

$$0 \leq \frac{n}{t_1} \leq 1 \quad \text{Equation 3}$$

According to an example, which is in no way intended to limit the invention, the time unit selection associated with an analysis window of 270 days ($t_1$), for which a new extent allocation has been found 455 times (n) in the examined SMF data would preferably result in a time unit on the scale of hours or even smaller units of time. This time unit scale is determined using Equation 3 above. Time units on the scale of hours, or other smaller units of time, fall within the range illustrated in Equation 3 (i.e., 0≤455/(270*24 hours) ≤1), whereas a time unit on the scale of days does not fall within the range illustrated in Equation 3 as 455/270 is greater than 1, not less than or equal to 1. However, it should be noted that in some embodiments, a unit of time may be used even if it does violate the range presented in Equation 3.

Simple Pattern Determination Mechanism

According to another embodiment, the predicted future total space allocation based on characteristics of the source data set may include a pattern determination process. In other words, a pattern determination process may include examining past extent events in order to determine a pattern involving the sequence of time between extent events. This pattern, in combination with other criteria (e.g., which may be derived from the current source environment), may be used to reduce the risk of a new extent event failure occurring on the target data set, e.g., during a data migration. Thus, the predicted future total space allocation may be determined using a pattern involving the sequence of time between extent events.

Looking to FIG. 7, the table 700 depicted therein lists the date and time associated with extent events which have occurred. Table 700 additionally lists the amount of time between extent events. Upon examining the data presented with regard to the amount of time between extent events, a pattern among the extent events becomes apparent. Specifically, the amount of time separating two extent events alternates between 10:30:00 and 21:00:00 hours. Thus, for example, if the 8th event observation (represented in the row marked by the "8") is the last known extent event, the pattern among the extent events may be used to predict when the next extent event will occur. Applying the pattern described above, the next (9th) extent event may be predicted to occur 21:00:00 hours after the 8th extent event which occurred on Jan. 5, 2013 at 11:00 pm. Thus, the 9th extent event may be predicted to occur on Jan. 6, 2013 at 8 pm.

According to different embodiments, a pattern between extent events may be more or less difficult to detect by a user, a controller, a processor, etc. Thus, information other than the time and date at which the extent event occurred may be examined in order to determine a pattern between the extent events. For example, an amount of data being migrated, a source volume, a target volume, etc., may be recorded and/or examined preferably in order to determine a pattern between the extent events. Moreover, according to some embodiments, the length of a migration window may be adjusted to affect the granularity of the extent event evaluation. In some approaches, which are in no way intended to limit the invention, the migration window may be increased to find a pattern of less, but sufficient accuracy.

Data Set Utilization

According to another embodiment, the predicted future total space allocation based on characteristics of the source data set may include an analysis of utilization of the source data set. Certain types of data sets allow the determination of "utilization" values. By keeping track of these utilization values, a trend can be calculated and the utilization for a certain point in time (or time period) may be forecasted. Thus, this forecast may represent the probability of new extent events occurring.

Looking to FIG. 8A, a table 800 presents information associated with a specific data set. Assuming the information illustrated in the table 800 is available to a user, a controller, a processor, etc., for the specific data set, analysis of the utilization for the source data set may be performed. Specifically, the utilization percentage may be forecasted to the planned (or estimated) end time of a migration by linear extrapolation based on the last two extent event observations.

Applying the foregoing forecast to an exemplary embodiment, if the migration is planned to end on May 5th at 5:30 pm, the utilization percentage may be extrapolated using the following Equation 4:

$$y(x_*) = y_{k-1} + \frac{x_* - x_{k-1}}{x_k - x_{k-1}} (y_k - y_{k-1}) \quad \text{Equation 4}$$

With reference to Equation 4, the variables are intended to represent the following:
y: utilization percentage at a given interval.
x: time value.
k: last observation.
k−1: second last observation.
*: future observation.

Figures 8B, 9:
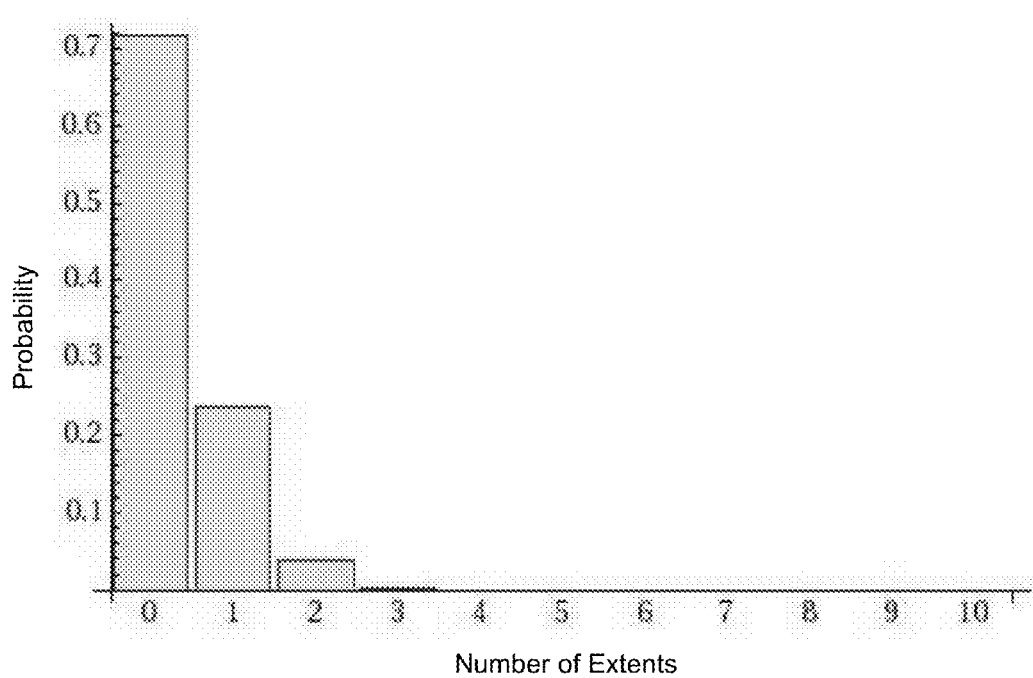
FIG. 8B is a table which lists the information in FIG. 8A which has been converted in accordance with one embodiment.
FIG. 9 is a graph depicting the probability of new extent events over a given interval in accordance with one embodiment.

It should be noted that, in order to use the dates and times presented in FIG. 8A as numeric input values for Equation 4, the dates and times are preferably converted appropriately. For example, a suitable converted value may include one or more time of day (TOD) clock value of an associated machine. Accordingly, the dates and times presented in FIG. 8A have been converted to the number of minutes since May 1st at 12 am, and presented in the table 850 of FIG. 8B. Thus, the aforementioned data presented in FIG. 8B may be applied to Equation 4 as follows:

$$y(x_*) = 40 + \frac{6810 - 1992}{4222 - 1992}(56 - 40)$$

Which can be simplified to the following:

$$y(x_g) = 74.563$$

The forecast calculated using Equation 4 above represents the utilization percentage. Thus, according to the present exemplary embodiment, there is a predicted 74.568% utilization of the data set during a migration, which implies no new extent requirements. Alternatively, if the utilization percentage on May 3rd at 10.22 pm was 85% instead of the 56% listed in table 800 of FIG. 8A, the forecast value y(x*) calculated using Equation 4 would equate to 137.224% rather than the 74.568% seen above. It therefore follows that the source data set may require new extents during the migration. Hence, additional reserve space may be required for the target data set.

Predicting the Data Set Size Using the Method of Least Squares

According to another embodiment, the predicted future total space allocation based on characteristics of the source data set may include applying a method of least squares. By looking at the trend of the total size of a data set in the past, the future size of the data set may be predicted using various statistical methods. This predicted future size of the data set may then be used to calculate the number of possible additional extent events which may occur during a defined migration window.

While numerous conditions may cause expansion or contraction of a particular data set over time, simple linear regression models may be used in some embodiments in view of the high probability that a majority of data sets follow a long term trend of a linear, logarithmic or hyperbolic function. These simple linear regression models may be generally expressed as follows:

$$f(x_g) = a + b * g(x_g) \quad \text{Equation 5}$$

Moreover, results achieved when Equation 5 is applied may be interpreted as follows:

Linear polynomial: $g(x_*) = x_*$

Logarithmic: $g(x_*) = \ln x_*$

Hyperbolic or Inverse: $g(x_*) = \frac{1}{x_*}$

As would be appreciated by one skilled in the art upon reading the present description, this coefficient may be used to indicate how well the source data set fits a given regression, preferably such that a determination may be made as to the regression which best fits the source data set, e.g., to determine a predicted future total space allocation for the source data set. The variables "a" and "b" from Equation 5 may be determined via the method of least squares which has been represented by Equation 6-Equation 6.3 below as would be appreciated by one skilled in the art upon reading the present description.

$$a = \bar{y} - b\bar{x} \quad \text{Equation 6}$$

$$b = \frac{\sum_{i=1}^{n} (g(x_i) - \bar{x})(y_i - \bar{y})}{\sum_{i=1}^{n} (g(x_i) - \bar{x})^2} \quad \text{Equation 6.1}$$

$$\bar{x} = \frac{1}{n} \sum_{i=1}^{n} g(x_i) \quad \text{Equation 6.2}$$

$$\bar{y} = \frac{1}{n} \sum_{i=1}^{n} y_i \quad \text{Equation 6.3}$$

Further still, in order to select the function to be used for a particular data set, the quality of its prediction is preferably determined. This may be accomplished by determining the "Coefficient of prognosis" ($R_{prog}^2$) using the "predicted residual sums of squares" (PRESS) value as seen in Equation 7.1 and Equation 7.2 respectively as would be appreciated by one skilled in the art upon reading the present description.

$$R_{prog}^2 = 1 - \frac{\text{PRESS}}{\sum_{i=1}^{n}(y_i - \bar{y})^2} \quad \text{Equation 7.1}$$

$$\text{PRESS} = \sum_{i=1}^{n}(y_i - \hat{y}_{i,i})^2 \quad \text{Equation 7.2}$$

Poisson Distribution

According to yet another embodiment, the predicted future total space allocation based on characteristics of the source data set may include using a Poisson distribution. According to a specific approach, which is in no way intended to limit the invention, the Poisson frequency function may use historical data to determine the probability, P(y), of new extent events over a given interval. Moreover, the Poisson frequency function may be generally expressed as follows:

$$P(y) = \frac{\lambda^y}{y!} e^{-\lambda}, \, y = \{0, 1, 2, 3, \ldots\} \quad \text{Equation 8}$$

With reference to Equation 8, the variables are intended to represent the following:

λ: the average number of new extent events in the given interval.

e: Euler's number (≈2.7182818284).

y: the number of new extent events.

According to an exemplary in-use embodiment, historical data used to determine the Poisson frequency may implement an interval of 270 days and 10 new extents (i.e., λ=10). It should be noted that analysis preferably implements, but is in no way limited to, intervals on the order of days, hours, or minutes. For example, according to the same exemplary in-use embodiment, in the case of intervals of one day, the average number of new extent events in the given interval would be λ=10/270=1/27.

Furthermore, to consider t non-overlapping intervals, the average number of new extent events in the given interval becomes λt. It follows that the average number of new extent events in the given interval according to the same exemplary in-use embodiment, for an interval of 9 days would be λt=9/27=1/3. FIG. 9 presents a graphical representation 900 of the values achieved by applying Equation 8 to the present exemplary in-use embodiment, exhibiting the probabilities for a certain number of new extents occurring in an interval of 9 days.

Analysis of Previous Migration Window

According to another embodiment, the predicted future total space allocation based on characteristics of the source data set may include an analysis of a previous virtual migration window. By analyzing previous virtual migration windows in comparison to a planned migration, e.g., using historical data, a previous migration window having similar properties to the planned migration may be chosen to improve target space utilization. According to different approaches, the properties considered in choosing a prior migration window may include, but are in no way limited to, matching elapsed time intervals; matching business cycles, e.g., month-end, quarter-end, year-end processing, etc.; etc. For example, an embodiment evaluating matching elapsed time intervals may choose the previous 72 hour interval in response to the planned migration window being determined to be 72 hours. According to another example, an embodiment evaluating matching business cycles may choose a window during the previous month-end cycle in response to the planned migration window falling within a month-end cycle.

Moreover, the analysis of a previous virtual migration window may be performed in different ways, e.g., depending on the desired embodiment. According to some embodiments, the behavior of a data set in question may simply be observed for a period of time. If the data set extends during the observation period, it may be assumed the same and/or similar behavior will occur during the planned migrations.

However, according to other embodiments, analytical methods may be implemented. In one approach, new data set extent allocations may be continuously monitored. Moreover, at the time a migration is about to be initiated, analysis may be made as to which weight factors would have had the best prediction quality when collecting a last portion of the collected historical data in the size of the migration window as the prediction window, and a portion of the historical data before the last portion as input data for the various procedures. Moreover, the weight factors of the various prediction procedures may be adjusted such that a majority of new extent events which occur in the prediction window are foreseen.

The weight factors may be used, in combination with the entire history data base, to predict the number of new extent events which may occur during the migration window for every data set being migrated. In this manner, this analysis provides somewhat of a prioritization of the methods used to predict new data set extent events.

As previously discussed, one or more of the various exemplary procedures described herein may be used to forecast the potential for additional space required on target volumes as a result of new extent events. In the case where the forecast analysis employs more than one procedure (e.g., method), the migration process may select the best fit (e.g., most accurate estimation) to be applied to the given embodiment. In some approaches, the processes described herein may be able to automatically chose the best available exemplary procedure (e.g., most accurate estimation) for determining the future size of a given source data set (e.g., file).

It follows that certain ones of the various exemplary procedures of determining a predicted future total space allocation of a source data set may be more effective in certain situations. One method may be optimal for a certain file and a different method may be optimal for another file, depending on the information available for a given file. For example, a predicted future total space allocation of a first source data set may be most accurately made using a Poisson distribution, while a predicted future total space allocation of a second source data set may be most accurately made using a historical probability and/or the method of least squares. Thus, different embodiments described herein may be able to select and preferably perform one or more procedures for a first source data set which are the same, similar or different procedures performed during migration of a second source data set, e.g., based on the characteristics of the first and/or second source data sets.

For some embodiments having several procedures available for determining the predicted future total space allocation available in logic, at least one of the procedures may be selected and performed based on the characteristics of the source data set while a different one or more procedures may be selected and performed during migration of a second source data set based on the characteristics of the second source data set. However, according to some embodiments, the procedure used to determine a predicted future total space allocation of a source data set may be based on the data available pertaining to the source data set and/or the target volume being evaluated. Thus, the number of procedures and/or specific procedure selected to analyze the migration process may depend on the data available in a given embodiment.

However, in some embodiments, a user, controller, processor, etc. may select a preferred method of analysis, e.g., based on some predefined weightings. According to some approaches, a more aggressive reservation of free space may be preferred, e.g., in response to the source data set being smaller in size, being including valuable data, when a data migration is strongly desired, etc. However, in other approach a more conservative reservation of free space may be applied, e.g., in response to the source data set being larger in size, being migrated more frequently, etc.

Moreover, it should be noted that procedures other than those specifically described above may be used to predict the behavior patterns of data expansion during migration of a source data set, and ultimately making an accurate determination of a predicted future total space allocation of the source data set. Alternate procedures may apply one or more of Autoregressive Integrated Moving Average (ARIMA) Modeling of Time Series (e.g., Box-Jenkins), discrete Fourier transforms, spline interpolation, machine learning using logistic regression, neural networks, finite-state machines, Markov chains, etc., or any other procedure which may be apparent to one skilled in the art upon reading the present description.

Figure 10A:
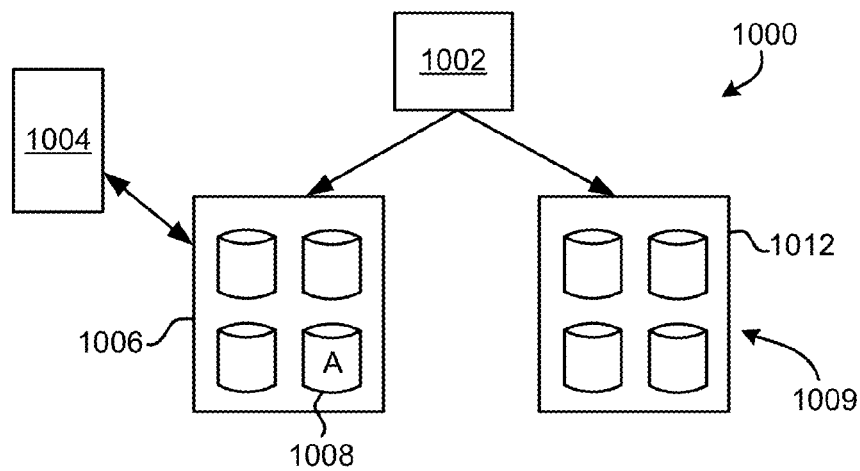
FIGS. 10A-10B are representational diagrams of a system in accordance with one embodiment.
Figure 10B:
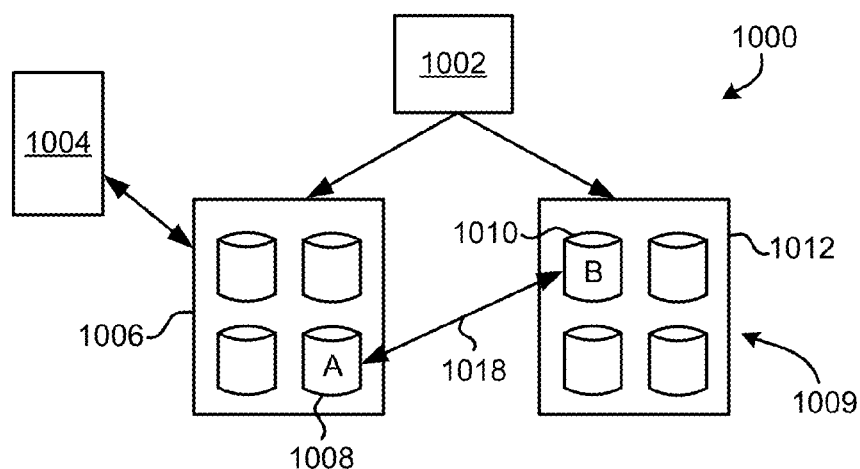

An exemplary application of the operations presented above with reference to method 400 is shown in FIGS. 10A-10B. Looking specifically to FIG. 10A, a system 1000 includes a source volume A 1008 having data to be migrated to a target volume. Without wishing to limit the invention, the source volume A 1008 may be positioned on a first storage subsystem 1006 and may be accessible to an application 1004. The system 1000 also includes a second storage subsystem 1012 (logical or physical), the second storage subsystem 1012 having a number of potential target volumes 1009, one of which may assist in facilitating the data migration. Moreover, according to a particular approach, a controller 1002, e.g., having copy services management software, may be used to control a data migration from the source volume A 1008 to a target volume, e.g., once selected. However, it should be noted that although a controller 1002 may be used in some approaches to control a data migration, migration software executing on z/OS may be used to control and/or influence data migration in other approaches as would be appreciated by one skilled in the art upon reading the present description.

Depending on the approach, a user and/or the controller 1002 may select a data set to be migrated, e.g., based on predetermined factors and/or conditions. Moreover, any one or more of the operations described above with reference to method 400 may be performed to select one of the potential target volumes 1009 as a target volume 1010 to perform the data migration.

When a target volume 1010 has been selected, the controller 1002 may establish (e.g., automatically) a mirrored relationship 1018 between the original source volume A 1008 and the target volume B 1010. Thus, data from source volume A 1008 may be migrated to target volume B 1010 using the mirrored relationship 1018 (e.g., such as a metromirror relationship, a mirror copy services relationship, a remote mirror relationship, etc.). Moreover, a change recording bitmap may be formed to keep track of the changes made to the source volume A 1008 which occur after the mirrored relationship 1018 is established.

Once the mirrored relationship 1018 is established to the target volume B 1010, the controller 1002 may continue to incrementally flash the source volume A 1008 to the target volume B 1010, until the number of mismatched tracks and/or out-of-sync (OOS) tracks represented in the change recording bitmap drops below a threshold, which may be a number of tracks (e.g., 10 tracks, 100 tracks, 500 tracks, etc.), a percentage of tracks to be transferred (e.g., 20%, 10%, 5%, 1%, 0.5% remaining, etc.), or any other threshold as would be understood by one of skill in the art upon reading the present descriptions. This may help to minimize the impact experienced by an application 1004 which utilizes the data stored to the source volume A 1008.

The mirrored relationship 1018 may quickly copy the data represented in the bitmap from the original source volume A 1008 to the target volume B 1010. Moreover, once completed, write input/output (I/O) is allowed to continue as per normal operation.

It should be noted that, although the source and target volumes 1008, 1009 are depicted as being on separate systems (e.g., source volume A 1008 is located on storage subsystem 1006 while target volumes 1009 are located on storage subsystem 1012), all storage subsystems are illustrated as being included in the overall system 1000. Moreover, according to some approaches, storage subsystem 1006 (the source storage system) and storage subsystem 1012 (the target storage system) may be embodied on a common storage subsystem.

Again, it follows that the various embodiments described herein focus on determining appropriate amount of space on a target volume to accommodate a data migration from a source data set during a timeframe, and the potential space requirements which may be associated therewith.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    selecting a source data set for migration;
    determining a predicted future total space allocation based on characteristics of the source data set;
    determining whether a target volume is capable of accommodating the predicted future total space allocation;
    migrating the source data set to the target volume in response to determining that the target volume is capable of accommodating the predicted future total space allocation; and
    requesting an adjustment to an amount of reserved free space on the target volume based on the predicted future total space allocation.

2. The method of claim 1, comprising, prior to determining whether a target volume is capable of accommodating the predicted future total space allocation:
    determining a total target volume free space of the target volume;
    determining potential space allocation for data sets already on the target volume; and
    determining the amount of reservable free space on the target volume based on the total target volume free space and the potential space allocation,
    wherein the determining whether the target volume is capable of accommodating the predicted future total space allocation of the source data set is based on the amount of reservable free space on the target volume.

3. The method of claim 1, wherein determining the predicted future total space allocation based on characteristics of the source data set includes:
    determining a target data set space allocation for the source data set; and
    determining additional potential space allocation for the source data set during the migration based on characteristics of the source data set.

4. The method of claim 3, comprising adjusting an amount of allocated free space on the target volume based on the target data set space allocation for the source data set.

5. The method of claim 1, wherein determining the predicted future total space allocation based on characteristics of the source data set is made without reference to other source data sets.

6. The method of claim 1, wherein several procedures for determining the predicted future total space allocation are available in logic, wherein at least one of the procedures is selected and performed based on the characteristics of the source data set.

7. The method of claim 6, comprising selecting and performing a different procedure during migration of a second source data set based on the characteristics of the second source data set.

8. The method of claim 1, comprising freeing unused reserved free space on the target volume upon completing the migration.

9. The method of claim 1, wherein determining the predicted future total space allocation based on characteristics of the source data set includes an analysis of properties of the source data set.

10. The method of claim 1, wherein determining the predicted future total space allocation based on characteristics of the source data set includes a historical probability.

11. The method of claim 1, wherein determining the predicted future total space allocation based on characteristics of the source data set includes a pattern determination process.

12. The method of claim 1, wherein determining the predicted future total space allocation based on characteristics of the source data set includes an analysis of utilization of the source data set.

13. The method of claim 1, wherein determining the predicted future total space allocation based on characteristics of the source data set includes a method of least squares.

14. The method of claim 1, wherein determining the predicted future total space allocation based on characteristics of the source data set includes using a Poisson distribution.

15. The method of claim 1, wherein determining the predicted future total space allocation based on characteristics of the source data set includes an analysis of a previous migration window.

16. The method of claim 1, wherein determining the predicted future total space allocation based on characteristics of the source data set includes at least one of:
Autoregressive Integrated Moving Average Modelling of Time Series, discrete Fourier transforms, spline interpolation, machine learning using logistic regression, neural networks, finite-state machines, and Markov chains.

17. A system, comprising:
a controller and logic integrated with and/or executable by the controller, the logic being configured to perform a method comprising:
selecting, by the controller, a source data set for migration;
determining, by the controller, a predicted future total space allocation based on characteristics of the source data set;
determining, by the controller, whether a target volume is capable of accommodating the predicted future total space allocation;
migrating the source data set to the target volume in response to determining that the target volume is capable of accommodating the predicted future total space allocation; and
requesting an adjustment to an amount of reserved free space on the target volume based on the predicted future total space allocation.

18. A computer program product comprising a computer readable storage medium having program instructions embodied therewith, the program instructions readable and/or executable by a controller to cause the controller to:
select, by the controller, a source data set for migration;
determine, by the controller, a predicted future total space allocation based on characteristics of the source data set;
determine, by the controller, whether a target volume is capable of accommodating the predicted future total space allocation;
migrate, by the controller, the source data set to the target volume in response to determining that the target volume is capable of accommodating the predicted future total space allocation; and
request, by the controller, an adjustment to an amount of reserved free space on the target volume based on the predicted future total space allocation.

19. The computer program product of claim 18, wherein prior to determining whether a target volume is capable of accommodating the predicted future total space allocation, the program instructions are readable and/or executable by the controller to cause the controller to:
determine, by the controller, a total target volume free space of the target volume;
determine, by the controller, potential space allocation for data sets already on the target volume; and
determine, by the controller, the amount of reservable free space on the target volume based on the total target volume free space and the potential space allocation,
wherein the determining whether the target volume is capable of accommodating the predicted future total space allocation of the source data set is based on the amount of reservable free space on the target volume.

20. The computer program product of claim 18, wherein determining the predicted future total space allocation based on characteristics of the source data set includes:
determining a target data set space allocation for the source data set; and
determining additional potential space allocation for the source data set during the migration based on characteristics of the source data set.

21. The computer program product of claim 20, comprising program instructions readable and/or executable by a controller to cause the controller to adjust an amount of allocated free space on the target volume based on the target data set space allocation for the source data set.

22. The computer program product of claim 18, wherein determining the predicted future total space allocation based on characteristics of the source data set is made without reference to other source data sets.

23. The computer program product of claim 18, wherein several procedures for determining the predicted future total space allocation are available, wherein at least one of the procedures is selected and performed based on the characteristics of the source data set, wherein a different procedure is performed during migration of a second source data set based on the characteristics of the second source data set.

24. The computer program product of claim 18, comprising program instructions readable and/or executable by a controller to cause the controller to free unused reserved free space on the target volume in response to completing the migration.

25. The computer program product of claim 18, wherein determining the predicted future total space allocation based on characteristics of the source data set includes at least one of:
an analysis of properties of the source data set,
a historical probability,
a pattern determination process,
an analysis of utilization of the source data set,
a method of least squares,
using a Poisson distribution, and
an analysis of a previous migration window.

* * * * *